United States Patent
Sullivan et al.

(10) Patent No.: US 11,929,617 B2
(45) Date of Patent: Mar. 12, 2024

(54) DYNAMIC ELECTRICAL LOAD CONTROL

(71) Applicant: Lockheed Martin Corporation, Bethesda, MD (US)

(72) Inventors: Christopher Patrick Sullivan, Monroe, CT (US); Melissa A. Baran, Prospect, CT (US); Matthew James Fogarty, Monroe, CT (US); Frederick L. Bourne, Morris, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 17/513,461

(22) Filed: Oct. 28, 2021

(65) Prior Publication Data
US 2023/0139012 A1    May 4, 2023

(51) Int. Cl.
*H02J 3/14* (2006.01)
*B64D 41/00* (2006.01)
*H02J 3/00* (2006.01)

(52) U.S. Cl.
CPC .............. *H02J 3/14* (2013.01); *B64D 41/00* (2013.01); *H02J 3/001* (2020.01); *B64D 2221/00* (2013.01); *H02J 2310/44* (2020.01); *H02J 2310/60* (2020.01)

(58) Field of Classification Search
CPC ........ H02J 3/14; H02J 2310/60; B64D 41/00; B64D 2221/00
See application file for complete search history.

(56) References Cited

U.S. PATENT DOCUMENTS

| | | | |
|---|---|---|---|
| 9,923,431 B2 | 3/2018 | Mountain et al. | |
| 11,018,521 B2 | 5/2021 | Freitag et al. | |
| 2018/0138716 A1* | 5/2018 | Bailey | H02J 4/00 |

* cited by examiner

*Primary Examiner* — Daniel Cavallari
(74) *Attorney, Agent, or Firm* — Michael Best & Friedrich LLP

(57) ABSTRACT

A load control unit includes a first input terminal configured to receive power, a second input terminal configured to receive load information, a first output terminal configured to provide a first portion of the power to a first load, a second output terminal configured to provide a second portion of the power to a second load, a memory, and an electronic processor communicatively connected to the memory, first input terminal, the second input terminal, the first output terminal, and the second output terminal. The electronic processor is configured to measure the power received via the first input terminal, receive load parameters via the second input terminal, and dynamically control, in response to measuring the power and receiving the load parameters, at least one of the first load or the second load based on the power that is measured and the load parameters that are received.

19 Claims, 8 Drawing Sheets

DYNAMIC ELECTRICAL LOAD CONTROL

GOVERNMENT LICENSE RIGHTS

This invention was made with Government support under Agreement No. W911W6-19-9-0005, awarded by the Army Contracting Command-Redstone Arsenal. The Government has certain rights in the invention.

BACKGROUND

Embodiments described herein relate to a dynamic electrical load control device and, more particularly, to systems and methods for enhanced power supply distribution on aircrafts based on electrical loads.

SUMMARY

Traditional aircraft electrical power systems use a variety of discrete components in their distribution architecture. For example, mechanical contactors are placed between power sources for electrical bussing, fusible device or current monitoring contactors provide fault protection, and circuit breaker panels are used to disconnect the components. These discrete components are heavy and take up substantial space in the aircraft, thus leading to compromises in electrical load distribution. In an emergency situation, loads must be dropped as a whole bus, potentially reducing mission capabilities. Previous methods to avoid dropping a whole bus resulted in doubling or tripling the bussing connection, which adds significant weight to the aircraft. Accordingly, there is a need for a load control unit that can handle power input switching and sourcing to groups of individual loads.

One embodiment of the present disclosure provides a load control unit. The load control unit includes a first input terminal configured to receive power, a second input terminal configured to receive load information, a first output terminal configured to provide a first portion of the power to a first load, a second output terminal configured to provide a second portion of the power to a second load, a memory, and an electronic processor communicatively connected to the memory, first input terminal, the second input terminal, the first output terminal, and the second output terminal. The electronic processor is configured to measure the power received via the first input terminal, receive load parameters via the second input terminal, and dynamically control, in response to measuring the power and receiving the load parameters, at least one of the first load or the second load based on the power that is measured and the load parameters that are received. Dynamically controlling at least one of the first load or the second load includes one of shedding the at least one of the first load or the second load from the power, connecting the at least one of the first load or the second load to receive at least one of first portion of the power or a second portion of the power, or transferring the at least one of the first load or the second load between different portions of the power.

One embodiment of the present disclosure provides a method of dynamically performing load control using a load control unit. The method includes measuring a power received via a first input terminal of the load control unit, receiving load parameters via a second input terminal of the load control unit, and dynamically controlling, in response to measuring the power and receiving the load parameters, at least one of a first load or a second load based on the power that is measured and the load parameters that are received. Dynamically controlling the at least one of the first load or the second load includes one of shedding the at least one of the first load or the second load from the power, connecting the at least one of the first load or the second load to receive at least one of first portion of the power or a second portion of the power, or transferring the at least one of the first load or the second load between different portions of the power.

One embodiment of the present disclosure provides a load control system. The load control system includes a load control unit, an input power source for providing input power to the load control unit, a first load connected to a first output of the load control unit, and a second load connected to a second output of the load control unit. The load control unit is configured to measure the power and receive load parameters. The load control unit if further configured to dynamically control, in response to measuring the power and receiving the load parameters, at least one of the first load or the second load based on the power that is measured and the load parameters that are received. Dynamically control the at least one of the first load or the second load includes one of shedding the at least one of the first load or the second load from the power, connecting the at least one of the first load or the second load to receive at least one of first portion of the power or a second portion of the power, or transferring the at least one of the first load or the second load between different portions of the power.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Traditional aircraft electrical power systems use a variety of discrete components in their distribution architecture. For example, mechanical contactors are placed between power sources for electrical bussing, fusible device or current monitoring contactors provide fault protection, and circuit breaker panels are used to disconnect the components. These components connect and switch different power sources to the different electrical buses where circuit breakers are grouped together. These bus groupings allow for the selection of certain loads to be powered on-ground, split between different sources, or isolated when an electrical fault occurs. However, these discrete components are heavy and take up substantial space in the aircraft, thus leading to compromises in electrical load distribution.

Additionally, in an emergency situation, loads must be dropped as a whole bus, potentially reducing mission capabilities. Previous methods to avoid dropping a whole bus resulted in doubling or tripling the bussing connection, which adds significant weight to the aircraft. Accordingly, there is a need for a single unit that can handle power input switching and sourcing to groups of individual loads. The single unit may handle complex dynamic load control.

Embodiments described herein provide systems and methods for dynamic power shedding, transferring, and distribution using a load control unit. To accomplish this, embodiments described herein provide a load control unit with the ability to receive power and load parameters and to determine which loads need to be shed and which loads require power based on the received power and load parameters.

Figure 1:
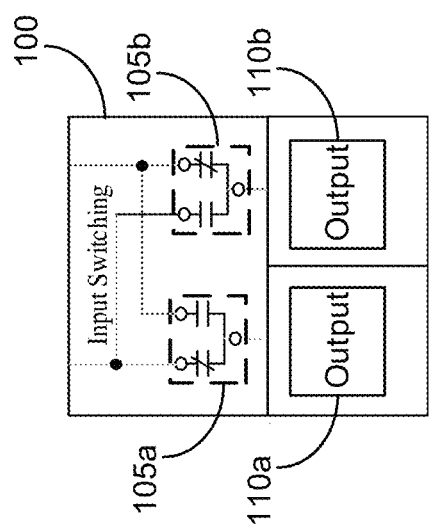
FIG. 1 is diagram illustrating a load control unit, according to some embodiments.

FIG. 1 illustrates a load control unit 100 according to embodiments described herein. The load control unit 100 includes solid state contacts 105a, 105b and output channels 110a, 110b. The solid state contacts 105a, 105b are connected to their respective output channels 110a, 110b. For example, solid state contact 105a is connected to output channel 110a and solid state contact 105b is connected to output channel 110b. The solid state contacts 105a, 105b switch power inputs to provide power from different electrical power sources to electrical loads connected to the output channels 110a, 110b. The electrical loads connected to the output channels 110a, 110b include flight critical electrical loads. The separate output channels 110a, 110b allow for electrical isolation of the connected electrical loads. For example, the electrical loads connected to output channel 110a may be shed by disconnecting solid state contact 105a. The electrical load connected to output channel 110b will be unaffected by disconnecting solid state contact 105a, and will remain powered by the input power via solid state contact 105b. The shedding and transferring of the electrical loads connected to the load control unit 100 is determined by a controller 200 (see FIG. 2) based on the input power received and load parameters.

In some embodiments, the load control unit 100 may provide 140 Amperes (Amps)-200 Amps per output channel 110a, 110b. In some embodiments, the load control unit 100 could provide current to 30 outputs per output channel 110a, 110b. In these embodiments, the load control unit 100 may include 60 total outputs. In some embodiments, the load control unit 100 may weigh in the range of 10-20 pounds (lbs.) and may include dimensions of 8 inches (in.) wide, 12 in. long, and 16 in. tall. However, in some embodiments that include fewer or greater than 30 outputs per output channel 110a, 110b, the weight and dimensions of the load control unit may be decreased or increased, respectively.

Figure 2:
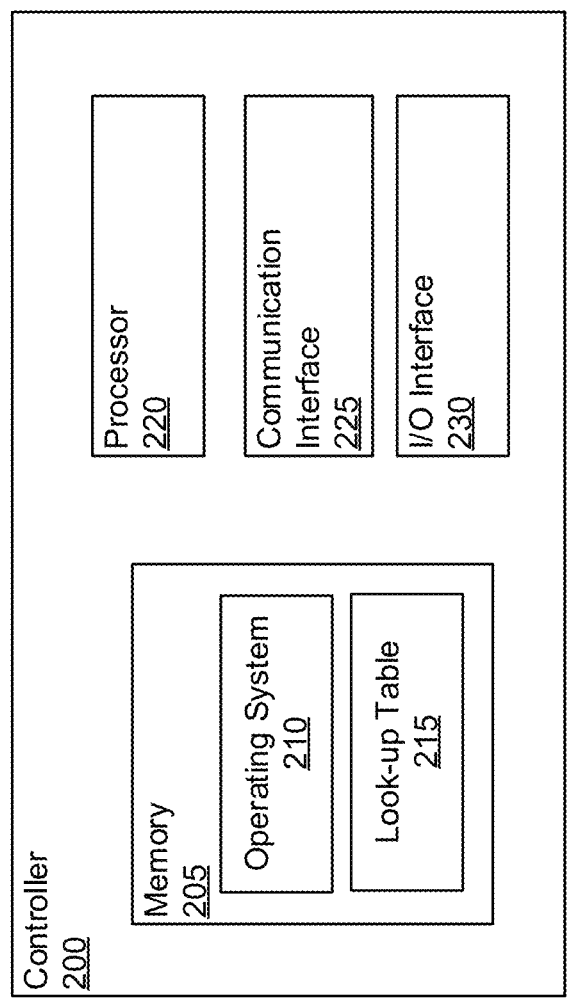
FIG. 2 is a block diagram illustrating a controller for use by the load control unit, according to some embodiments.

FIG. 2 illustrates the controller 200 for the load control unit 100. The controller 200 includes a memory 205, a processor 220, a communication interface 225, and an input/output interface 230. The memory 205 may be a non-transitory computer-readable memory. The memory 205 may include one or more types of memory storage, such as random-access memory (RAM), flash memory, solid-state memory, or hard-drive memory. In addition, or alternatively, the controller 200 may communicate with a cloudbased storage system. The memory 205 stores a load shedding program 210 and a look-up table 215 (see FIG. 7). The load shedding program 210 stores the operating parameters of the load control unit 100. For example, the load shedding program 210 may store the current status of the input power sources and the electrical loads that are connected to the load control unit 100 so the processor 220 can control dynamic load shedding and transferring based on the stored load shedding program 210. The look-up table 215 stores operational guidelines for the load control unit 100. The look-up table 215 will be described with respect to FIG. 7. The load shedding program 210 receives the status of the input power sources and the electrical loads via the input/output interface 230.

The processor 220 controls the solid state contactors 105*a*, 105*b* to shed, transfer, or connect the electrical loads based on the input from the load shedding program 210 and the look-up table 215. In some embodiments, the communication interface 225 is used by the controller 200 to communicate with other load control units. For example, the aircraft may include other load control units in addition to the load control unit 100. In some embodiments, the load control units may communicate with each other to provide power outputs to loads that require multiple load control units.

Figure 3:
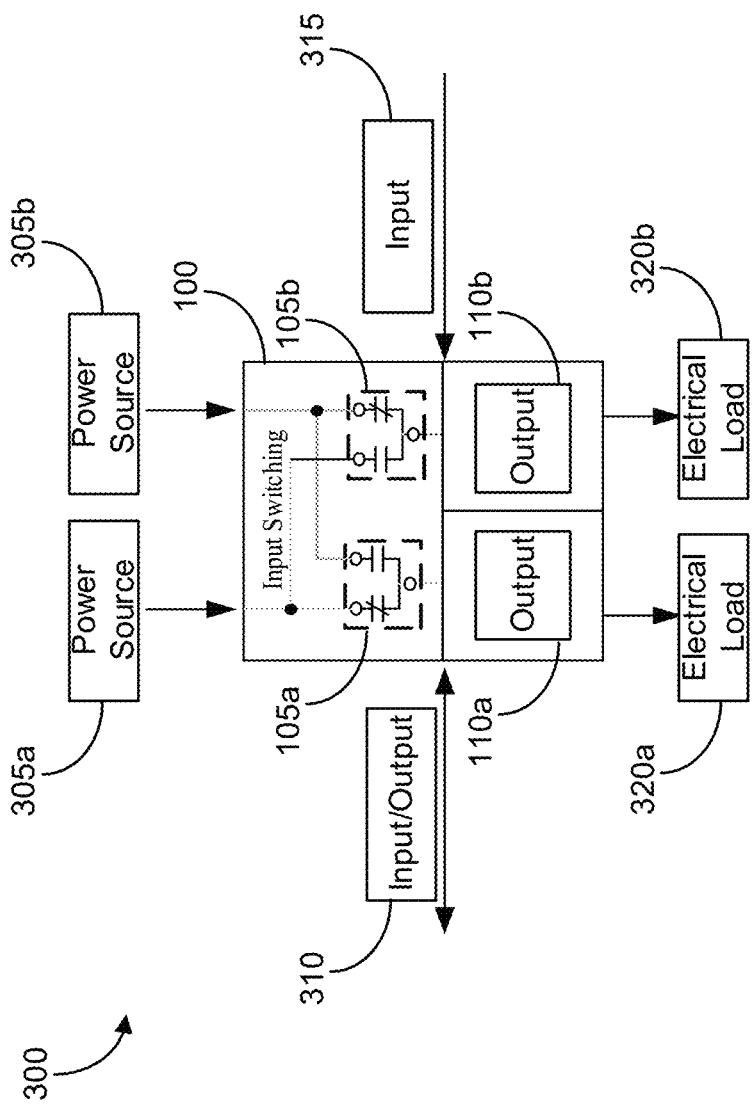
FIG. 3 is a diagram illustrating the load control unit with inputs and outputs, according to some embodiments.

FIG. 3 illustrates the load control unit 100 with inputs and outputs. The power contacts 105*a*, 105*b* receive input power from independent power sources 305*a*, 305*b*. The output channels 110*a*, 110*b* are coupled to electrical loads 320*a*, 320*b*. In some embodiments, the output channels 110*a*, 110*b* may be coupled to more than one load per output channel. For example, output channel 110*a* may be coupled to between one and thirty electrical loads and output channel 110*b* may be coupled to between one and thirty electrical loads. Thus, the load control unit 200 may provide power to between two and sixty electrical loads. The load control unit 100 includes a first communication port 310 that receives and sends information to other load control units. Additionally, the load control unit 100 includes a second communication port 315 that receives monitoring input from various systems on the aircraft.

The first communication port 310 communicates with other load control units. For example, communication between the load control units may include a status of a load control unit or a request from another load control unit to transfer, shed, and/or connect an electrical load. The second communication port 315 receives monitoring input for various systems on the aircraft. For example, inputs may include statuses of the engine of the airplane and the flight equipment, as well as user inputs by a person on the aircraft, and any other electronics that require power distribution.

Figure 4:
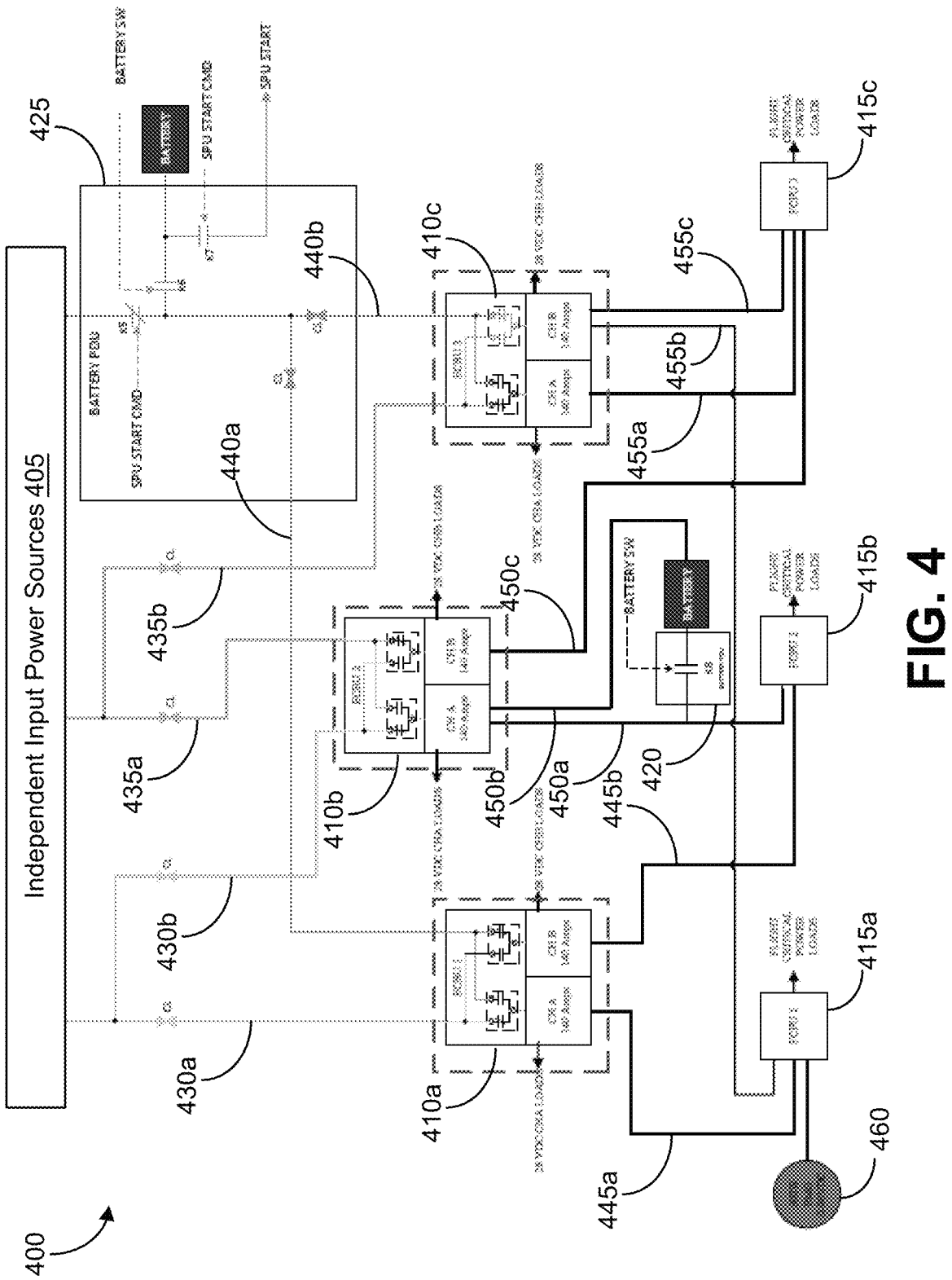
FIG. 4 is a diagram illustrating a distribution system implementing load control units, according to some embodiments.

FIG. 4 illustrates an airplane power distribution system 400. The power distribution system 400 includes independent input power sources 405 (similar to independent power sources 305*a*, 305*b*) and load control units 410*a*, 410*b*, 410*c* (similar to load control unit 100). In some embodiments, one of the load control units may be a master unit that communicates to the other load control units what dynamic load control they are to perform. Alternatively, or additionally, in some embodiments the load control units may be controlled by a control unit on the aircraft. In some embodiments, the load control units are independent of one another and thus, do not communicate with one another.

The independent input power sources 405 are independent input power sources that may or may not be connected to one another. For example, the independent input power sources 405 may include multiple, distinct generators that may output alternating current (AC) power. The AC power from the independent input power sources 405 is received by the load control unit 410*a*, 410*b*, 410*c* via AC electrical buses 430*a*, 430*b*, 435*a*, 435*b*, 440*a*, 440*b*. These AC electrical buses 430*a*, 430*b*, 435*a*, 435*b*, 440*a*, 440*b* transmit power from generators on the aircraft. For example, the aircraft may include a plurality of 45 kilovolt-amperes generators that output 115/200V at 400 Hz. These AC power sources generate the power needed by the electrical loads on the aircraft. At least one AC electrical bus is connected to a power contact of a load control unit, and in some embodiments, each power contact of the load control unit receives power from a different AC electrical bus. For example, the first AC electrical bus 430*a* provides power to both power contacts within the first load control unit 410*a* and a second AC electrical bus 440*a* also provides power to both power contacts within the first load control unit 410*a*. In some embodiments, the load control units 410*a*, 410*b*, 410*c* may be powered by the independent input power sources 405.

In some embodiments, the load control units 410*a*, 410*b*, 410*c* may each include a battery (not shown) that provides backup power to that unit. Additionally, or alternatively, in some embodiments, the load control units 410*a*, 410*b*, 410*c* may receive backup power from a dedicated generator, based on the configuration of the aircraft that the load control units 410*a*, 410*b*, 410*c* are used on. In some embodiments, the independent input power sources 405 provides power to backup power sources. For example, the power distribution system 400 includes a battery power distribution unit 425 that stores power from the independent input power sources 405 as DC power.

The output channels of the load control units 410*a*, 410*b*, 410*c* output a set amount of power to the electrical loads including flight critical power loads 415*a*, 415*b*, 415*c*. For example, the current output to the electrical loads may be in the range of 120-160 Amps. The first load control unit 410*a* may selectively output power to a first flight critical power load 415*a* via output line 445*a* coupled to a first output channel of the load control unit 410*a*. The first flight critical power load 415*a* may also receive power from a permanent magnet generator 460. The first load control unit 410*a* may also selectively output power to a second flight critical load 415*b* via output line 445*b*. The second flight critical power load 415*b* may also selectively receive power from the second load control unit 410*b* via output line 450*a*. The first channel of the second load control unit 410*b* provides power to a backup battery 420 via output line 450*b*. The output of the backup battery 420 is connected to output line 450*a* in order to help keep the second flight critical power load 415*b* powered in the event that the second load control unit 410*b* sheds the electrical load of its first output channel. The second output channel of the second load control unit 410*b* may selectively output power to a third flight critical power load 415*c* via output line 450*c*. The third load control unit 410*c* may selectively output power to the third flight critical power load 415*c* via output line 455*a*, to the first flight critical power load 415*a* via output line 455*b*, and to the third flight critical power load 415*c* via output line 455*c*.

The flight critical power loads 415*a*, 415*b*, 415*c* may selectively receive power from multiple load control units in the case that one load control unit must shed the load of the flight critical load, such that the flight critical load is still receiving power from the input power sources via a second load control unit.

Figure 5:
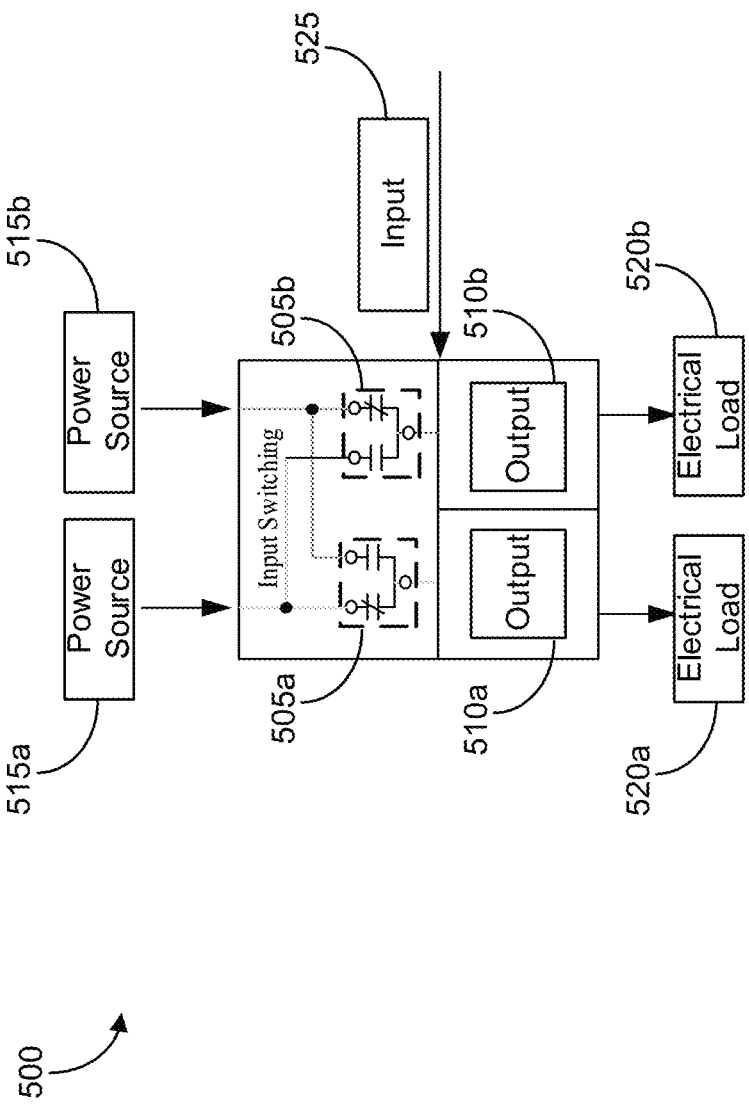
FIG. 5 is a diagram illustrating an alternative load control unit, according to some embodiments.

FIG. 5 is an alternative load control unit 500, according to one embodiment. In some embodiments, there may only be one load control unit, thus the load control unit 500 may not receive input communication from other load control units and may not output communication to other load control units. The load control unit 500 includes power contacts 505a, 505b and output channels 510a, 510b. The power contacts 505a, 505b receive input power from power sources 515a, 515b. The output channels 510a, 510b selectively output power to electrical loads 520a, 520b. The load control unit 500 receives monitoring input from the aircraft via the communication port 525.

Figure 6:
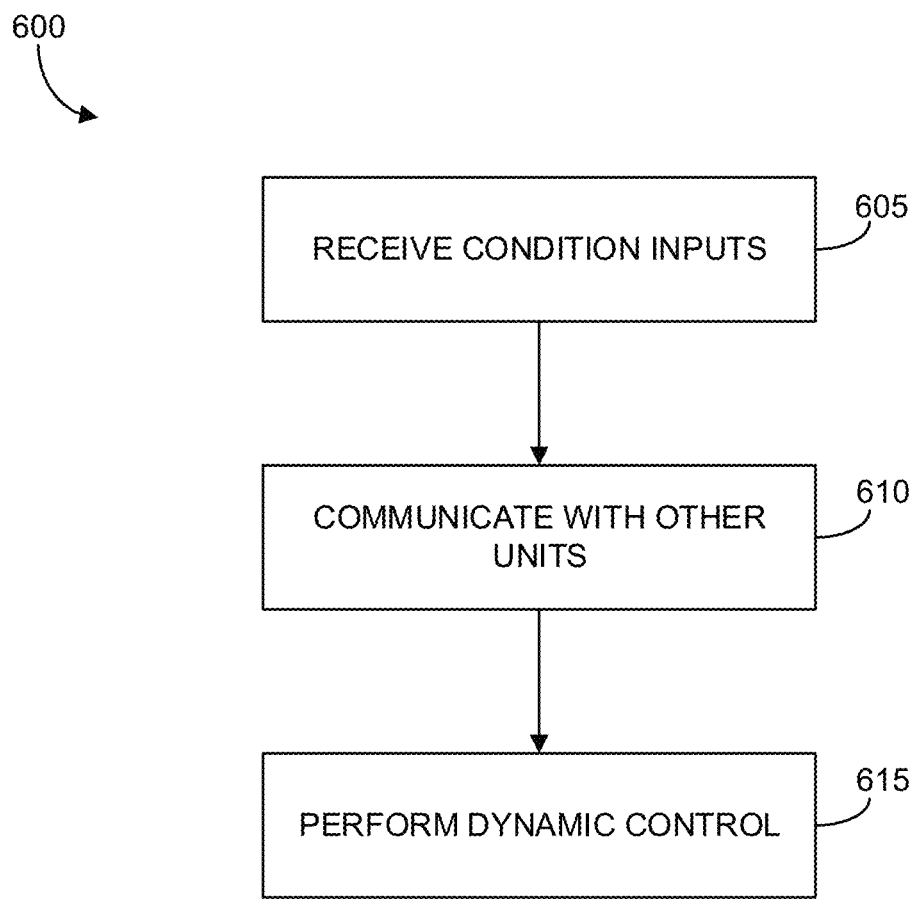
FIG. 6 is a flowchart illustrating a method of dynamically controlling loads, according to some embodiments.

FIG. 6 is a flowchart illustrating a method 600 for dynamically controlling loads using a load control unit. The method 600 may be implemented by the load control unit 100 of FIGS. 1 and 3, the load control units 410a, 410b, 410c of FIG. 4, and/or the load control unit 500 of FIG. 5. The method 600 may be executed by a controller, such as controller 200, to control load shedding and distribution according to embodiments described herein.

At block 605, the controller 200 receives condition inputs. For example, condition inputs may include available power input sources and the power they provide, information regarding blown fuses, and/or inputs that increase electrical loads. In some embodiments, condition inputs may include user inputs by a person on the aircraft.

At block 610, the controller 200 communicates with other load control units. For example, the controller 200 may receive a request from a load control unit for assistance in providing power to an electrical load. The controller 200 may also receive input from a load control unit to provide power to a load that that load control unit needs to shed.

At block 615, the controller 200 performs dynamic control via the load control unit 100 based on the received condition inputs and the communication with the other load control units. For example, the controller 200 may access the look-up table 215 and determines what to do with the electrical loads based on the input information and the content of the look-up table 215. In some embodiments, dynamic control via the load control unit 100 includes shedding loads, transferring loads to alternate input power sources, and isolating faults within the electrical loads. For example, the controller 200 may access the look-up table 215 and determine that the first electrical load 320a receiving power from the first output channel 210a needs to be shed. The controller 200 then operates the first power contact 105a to cut-off the flow of power to the first electrical load 320a. As another example, the controller 200 may access the look-up table 215 and determine that the second power source 305b cannot handle providing power to the second electrical load 320b. Thus, the second power contact 105b is switched to allow power to flow from the first power source 305a to the second electrical load 320b. Controlling the electrical loads based on the dynamic control is done instantaneously and simultaneously, such that loads do not experience interruptions.

Figure 7:
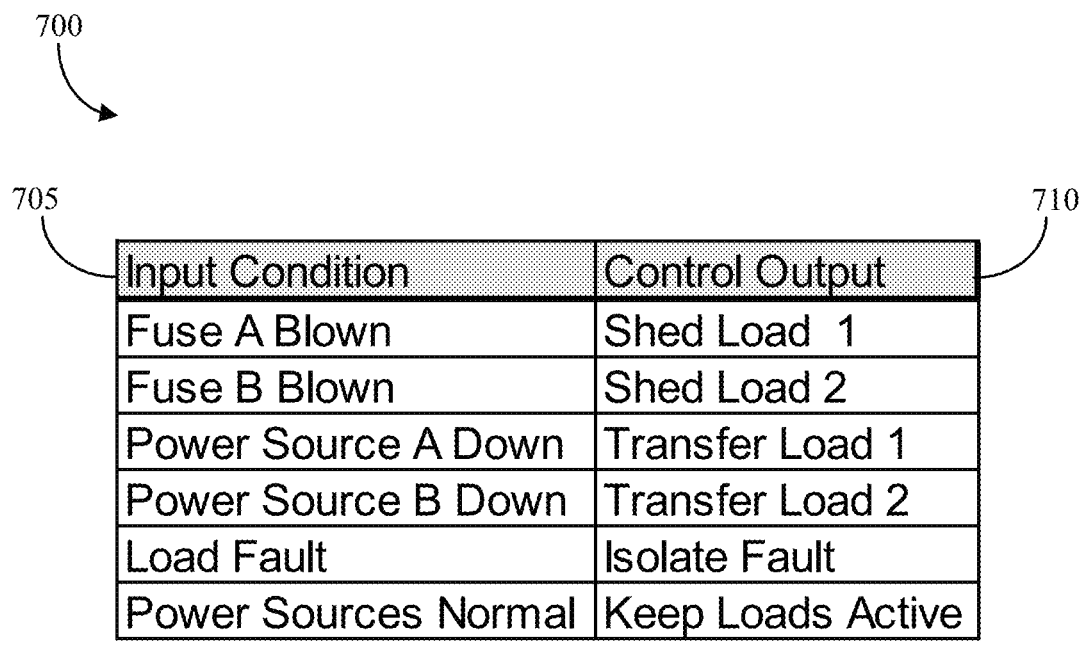
FIG. 7 is a table illustrating a look-up table for use by the controller of the load control unit, according to some embodiments.

FIG. 7 illustrates an exemplary look-up table 700 for use by a controller (e.g., controller 200) of a load control unit (e.g., load control unit 100). The look-up table 700 includes input conditions 705 and corresponding control outputs 710. In some embodiments, the look-up table may be defined by a user. As one example according to embodiments described herein, if the controller 200 determines that the first power source 305a is not providing power (i.e., "Power Source A Down"), then the controller 200 instructs the first power contact 105a operate to transfer power from the second power source 305b to the first electrical load 320a (i.e., "Transfer Load 1").

Additional input conditions and additional control outputs to those illustrated in FIG. 7 are contemplated. For example, an input condition 705 could result in a load control unit creating a virtual dual sourcing to an electrical load utilizing only one wire from two separate input power sources. As another example, the input condition 705 may be an operating temperature and the control output 710 may correspond to various temperature regulating components being shed (e.g., shedding heaters when the ambient temperature is above a temperature threshold). As another example, the input condition 705 may be a predetermined mission and the control output 710 may correspond to electrical load(s) that may be low priority to the predetermined mission such that electrical load(s) with low priority may be shed and high priority mission equipment may remain powered or may receive additional power.

Figure 8:
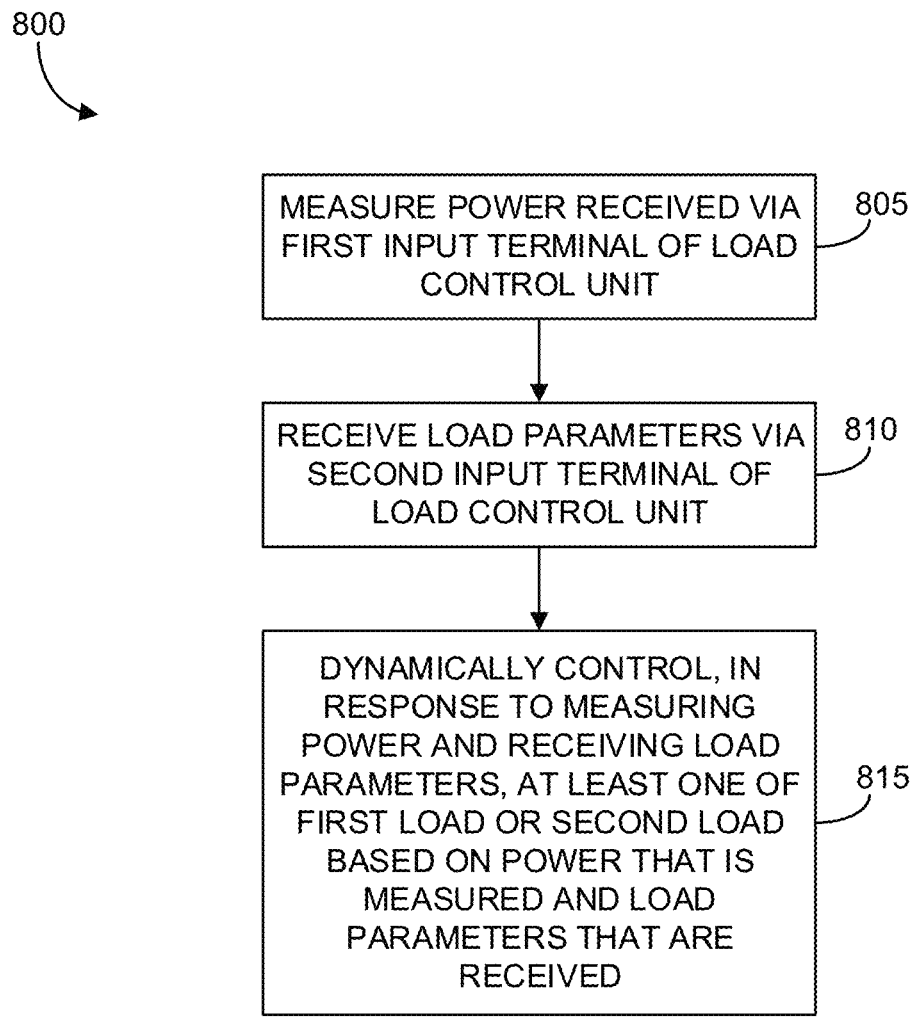
FIG. 8 is a flowchart illustrating a method of dynamically controlling loads using a load control unit, according to some embodiments.

FIG. 8 is a flowchart illustrating a method 800 for dynamically controlling loads using a load control unit. The method 800 may be implemented by the load control unit 100 of FIGS. 1 and 3, the load control units 410a, 410b, 410c of FIG. 4, and/or the load control unit 500 of FIG. 5. The method 800 may be executed by a controller, such as controller 200, to control load shedding and distribution according to embodiments described herein.

At block 805, the method 800 includes the controller 200 measuring a power received via a first input terminal of the load control unit. In some embodiments, the power may be received by at least one of the power contacts 105a, 105b of the load control unit 100. In some embodiments, the controller 200 may measure the power received with a sensor (e.g., a current transformer, Hall effect sensor, or other suitable power measurement sensor). The power may be measured within the load control unit 100 at an input and then provided to the processor 220 via a data bus link, such as the first communication port 310 (see e.g., FIG. 3).

At block 810, the method 800 includes the controller 200 receiving load parameters via a second input terminal of the load control unit. In some embodiments, the load parameters are received by the communication ports 310, 315 of the load control unit 100.

At block 815, the method 800 also includes the controller 200 dynamically controlling, in response to measuring the power and receiving the load parameters, at least one of a first load or a second load based on the power that is measured and the load parameters that are received. Dynamically controlling the at least one of the first load or the second load includes one of: shedding the at least one of the first load or the second load from the power, connecting the at least one of the first load or the second load to receive at least one of a first portion the power or a second portion of the power, or transferring the at least one of the first load or the second load between different portions of the power. In some embodiments, the first load is connected to the first output channel 110a and the second load is connected to the second output channel 110b. In other embodiments, the first load is one of a first plurality of loads (e.g., twelve loads) connected to the first output channel 110a and the second load is one of a second plurality of loads (e.g., twelve loads) connected to the second output channel 110b.

In some examples, the method 800 may further include the controller 200 receiving a first control input. In some embodiments, the first control input is received via the first solid state contact 105a. The method 800 may further include the controller 200 connecting the first portion of the power to the first load based on the first control input. The method may further include the controller 200 receiving a second control input. In some embodiments, the second control input is received via the second solid state contact 105. The method may further include the controller 200 connecting the second portion of the power to the second load based on the second control input.

The method 800 may further include the controller 200 dynamically controlling at least one of the first load or the second load based on a look-up table. For example, the controller 200 may use the look-up table 700. The controller 200 may perform the similar dynamic control as mentioned above with respect to block 815 based on input conditions corresponding to the load parameters and control outputs defining the dynamic control in the look-up table 700.

Thus, embodiments described herein provide, among other things, dynamic electrical load transferring and shedding. Various features and advantages are set forth in the following claims.

What is claimed is:

1. A load control unit comprising:
a first solid state contact including a first input terminal, a second input terminal, and a first output terminal, wherein the first input terminal is configured to receive a first portion of power and the second input terminal is configured to receive a second portion of the power, and wherein the first output terminal is electrically connected to a first load;
a second solid state contact including a third input terminal, a fourth input terminal, and a second output terminal, wherein the third input terminal is configured to receive the first portion of the power and the fourth input terminal is configured to receive the second portion of the power, and wherein the second output terminal is electrically connected to a second load;
a communication port configured to receive load parameters;
a memory; and
an electronic processor communicatively connected to the memory, the first input terminal, the second input terminal, the first output terminal, and the second output terminal, the electronic processor configured to
measure the power received by at least one of the first solid state contact and the second solid state contact,
receive the load parameters via the communication port,
dynamically control, in response to measuring the power and receiving the load parameters, at least one of the first load or the second load based on the power that is measured and the load parameters that are received, and
wherein dynamically control the at least one of the first load or the second load includes one of:
shedding the at least one of the first load or the second load from the power,
connecting the at least one of the first load or the second load to receive at least one of the first portion of the power or the second portion of the power, or
transferring the at least one of the first load or the second load between different portions of the power.

2. The load control unit of claim 1, further comprising:
the first solid state contact is configured to
receive a first control input from the electronic processor, and
connect the first portion of the power to the first load based on the first control input, and
the second solid state contact is configured to
receive a second control input from the electronic processor, and
connect the second portion of the power to the second load based on the second control input.

3. The load control unit of claim 1, wherein the first output terminal is electrically isolated from the second output terminal.

4. The load control unit of claim 1, wherein the memory includes a look-up table including input conditions corresponding to the load parameters and control outputs defining the dynamic control.

5. The load control unit of claim 4, wherein the electronic processor is further configured to dynamically control the at least one of the first load or the second load based on the look-up table.

6. The load control unit of claim 1, wherein the load parameters includes parameters associated with avionics.

7. A method of dynamically performing load control using a load control unit including a first solid state contact, a second solid state contact, a communication port, a memory, and an electronic processor, the method comprising:
measuring a power received via a first input terminal of the first solid state contact;
receiving load parameters via the communication port; and
dynamically controlling, in response to measuring the power and receiving the load parameters, at least one of a first load or a second load based on the power that is measured and the load parameters that are received, and
wherein dynamically controlling the at least one of the first load or the second load includes one of:
shedding the at least one of the first load or the second load from the power,
connecting the at least one of the first load or the second load to receive at least one of a first portion the power or a second portion of the power, or
transferring the at least one of the first load or the second load between different portions of the power,
wherein the first solid state contact includes the first input terminal, a second input terminal, and a first output terminal, wherein the first input terminal is configured to receive the first portion of power and the second input terminal is configured to receive the second portion of the power, and wherein the first output terminal is electrically connected to the first load,
wherein the second solid state contact includes a third input terminal, a fourth input terminal, and a second output terminal, wherein the third input terminal is configured to receive the first portion of the power and the fourth input terminal is configured to receive the second portion of the power, and wherein the second output terminal is electrically connected to the second load, and
wherein the electronic processor is communicatively connected to the memory, the first input terminal, the second input terminal, the first output terminal, and the second output terminal.

8. The method of claim 7, further comprising:
receiving a first control input via the first solid state contact;
connecting the first portion of the power to the first load based on the first control input;
receiving a second control input via the second solid state contact; and
connecting the second portion of the power to the second load based on the second control input.

9. The method of claim 8, wherein the first solid state contact receives the first portion of the power and the second solid state contact receives the second portion of the power.

10. The method of claim 7, wherein the second output terminal is electrically isolated from the first output terminal.

11. The method of claim 7, further comprising:
dynamically controlling the at least one of the first load or the second load based on a look-up table.

12. The method of claim 11, wherein the look-up table includes input conditions corresponding to the load parameters and control outputs defining the dynamic control of the least one of the first load or the second load.

13. The method of claim 7, wherein the load parameters includes parameters associated with avionics.

14. A load control system comprising:
a load control unit including a first solid state contact and a second solid state contact, the first solid state contact including a first input and a second input, and the second solid state contact including a third input and a fourth input;
an input power source for providing power to the load control unit, wherein the input power source provides a first portion of power to the first input of the first solid state contact and the third input of the second solid state contact and provides a second portion of power to the second input of the first solid state contact and the fourth input of the second solid state contact;
a first load connected to a first output of the first solid state contact;
a second load connected to a second output of the second solid state contact;
wherein the load control unit is configured to measure the power and receive load parameters,
wherein the load control unit is configured to dynamically control, in response to measuring the power and receiving the load parameters, at least one of the first load or the second load based on the power that is measured and the load parameters that are received, and
wherein dynamically control the at least one of the first load or the second load includes one of:
shedding the at least one of the first load or the second load from the power,
connecting the at least one of the first load or the second load to receive at least one of the first portion of the power or the second portion of the power, or
transferring the at least one of the first load or the second load between different portions of the power.

15. The load control system of claim 14, wherein the first solid state contact is configured to provide the first portion of the power to the first load based on a first control input received by the load control unit, and the second solid state contact is configured to provide the second portion of the power to the second load based on a second control input received by the load control unit.

16. The load control system of claim 14, wherein the first load is connected to a first output terminal and the second load is connected to a second output terminal that is electrically isolated from the first output terminal.

17. The load control system of claim 14, wherein the load control unit is configured to dynamically control the at least one of the first load or the second load based on a look-up table.

18. The load control system of claim 17, wherein the look-up table includes input conditions corresponding to the load parameters and control outputs defining the dynamic control.

19. The load control unit of claim 1, wherein the first portion of the power is from a first power source and the second portion of the power is from a second power source that is different from the first power source.

* * * * *